June 13, 1972

D. GUYTON 3,669,530

LENS FOR TARGET IMAGE DISPLACEMENT IN
A LENS MEASURING INSTRUMENT
Filed Jan. 26, 1970

DAVID GUYTON
INVENTOR

BY

ATTORNEY

3,669,530
LENS FOR TARGET IMAGE DISPLACEMENT IN A LENS MEASURING INSTRUMENT
David Guyton, Brookline, Mass.
(5505 Huntington Parkway, Bethesda, Md. 20014)
Filed Jan. 26, 1970, Ser. No. 5,705
Int. Cl. A61b 3/00, 3/02
U.S. Cl. 351—17                                                5 Claims

ABSTRACT OF THE DISCLOSURE

In a lens measuring instrument or optometer of the type employing a target, scale, and converging lens for measuring the power of a lens or the power error of an eye in two principal meridians, means are disclosed for moving an image of one orthogonal target segment through the plane of an image of another such target segment facilitating simultaneous measurement of the two meridians and allowing the use of a plurality of types of targets.

BACKGROUND OF THE INVENTION

Field of the invention

The invention resides generally in the field of lens measuring instruments for measuring the power of lenses and in optometers for refracting or measuring the power error of the eye.

Description of the prior art

Instruments which are the subject of the present invention are well known in the prior art. They are based on the principle of using a target in conjunction with a converging lens and scale to simulate in a specified plane a continuously variable lens having both converging and diverging power ranges. This simulated lens is used to neutralize the power of the lens under test, be it the power of an optical lens or the power error of the eye. The subject lens under test is positioned coincident with or near the plane of the simulated lens whose power is varied by moving the target along the scale until neutralization, that is, target focus or alignment, is detected by a viewing system through the subject lens. The power of the lens or power correction for the eye is then read from the scale.

In the case of optical lens measuring instruments, the above named viewing system is most commonly a low power telescope used in conjunction with an observer's eye, the telescope serving to magnify greatly any deviation from the neutralization condition of focus or alignment. In the case of optometers, the viewing system consists solely of that part of the subject's eye which focuses parallel ray bundles on to the retina, and the simulated lens is equivalent to a corrective spectacle lens which would be used to neutralize the power error of the eye to allow normal distance vision, that is, the ability to form images of distant objects on the retina.

Spherocylindrical lenses and astigmatic eyes are encountered when using these instruments, and it is therefore desirable in these instruments to be able to measure power in the two principal meridians of the subject lens simultaneously. Every spherocylindrical lens may be resolved into two cylindrical lens components with axes at right angles to each other. The principal meridians of the lens coincide with these two axes. A spherocylindrical lens is described completely by specifying the orientation of the principal meridians and the power acting in each principal meridian, that is, the power of each of the cylindrical components.

Simultaneous power measurement in the two principal meridians, that is, measurement of power in the second principal meridian while the instrument remains adjusted for power in the first principal meridian, requires that the target used in the instrument be separated into two orthogonal target segments independently movable axially. Each target segment is oriented appropriately for power measurement in its corresponding principal meridian. Since it is usually not known which principal meridian of the subject lens has the more or less power, it is desirable to provide two orthogonal target segments each of which is independently movable through the plane of the other. With such target segments, the power in either principal meridian may be measured first since the second target segment, in then measuring the power in the second principal meridian, may move axially to either side of the first target segment.

Means for separating a target into two independently axially movable target segments are known in the prior art. For example, U.S. Pat. 1,070,631, describing an optometer, issued to G. A. Rogers, shows the use of two crossed cylindrical lenses having orthogonal axes located on the posterior side of the converging lens system which cylindrical lenses image a distant target into the object space of the converging lens system. Each cylindrical lens images in its principal focal plane a segment of the target which segment is aligned with the axis of the cylindrical lens. This system does not allow one target segment to be moved through the plane of the other because the two cylindrical lenses have equal focal lengths.

Other means have been devised which provide two independently movable orthogonal target segments capable of passing through the plane of one another. U.S. Pat. 1,542,112 issued to E. D. Tillyer describes the use of a cylindrical lens to image a line target at a constant axial displacement from the actual line target on the posterior side of the converging lens. U.S. Pat. 1,204,030 issued to G. Kellner shows the use of a spherical lens moving with a line target to accomplish the same purpose. Both systems are limited to line targets, and both require that the target and imaging lens move fixedly together axially to maintain appropriate scale calibration.

SUMMARY OF THE INVENTION

The present invention is directed to apparatus which, in instruments of the character described above, allows simultaneous power measurement in both principal meridians, allows the use of a plurality of different types of targets, and allows the power determination in either principal meridian prior to the other.

This is accomplished by the placement of a cylindrical lens on the anterior side of the converging lens which cylindrical lens adds cylindrical power effect to the light coming from that target segment which is aligned with the axis of said cylindrical lens. Since power determination of the subject lens is almost always carried out at the anterior principal focal plane of the converging lens to facilitate a linear scale, it is desirable although not necessary to position the cylindrical lens in that focal plane, which positioning retains the linearity of the scale and also retains equal magnification in the two principal meridians.

The cylindrical lens used may be either converging or diverging. If converging, its axis should be aligned with the forward target segment because converging cylindrical power will have the optical effect of displacing an aligned target segment backward. If the cylindrical lens is diverging, its axis should be aligned with the rear target segment because diverging cylindrical power will have the optical effect of displacing an aligned target segment forward.

Thus the cylindrical lens acts to displace an image of one target segment toward and even through the plane of another. These target segments may be segments of a visual acuity target, for example, or may be line targets, or may be segments of any other type of target which would prove useful in power determination. Further, the cylindrical lens is stationary and is not moved with the target as was required in prior art systems. Additionally, either the target segment aligned with the cylindrical lens or its orthogonal counterpart may be moved over a wide range without interfering with the other, and thus an independent determination of the power in each principal meridian may be made without having to determine the higher or lower power principal meridian first.

The foregoing description of the present invention will become more apparent from the following detailed specification when read in conjunction with the accompanying drawing.

DESCRIPTION OF THE PREFERRED EMBODIMENT

Figure 1:
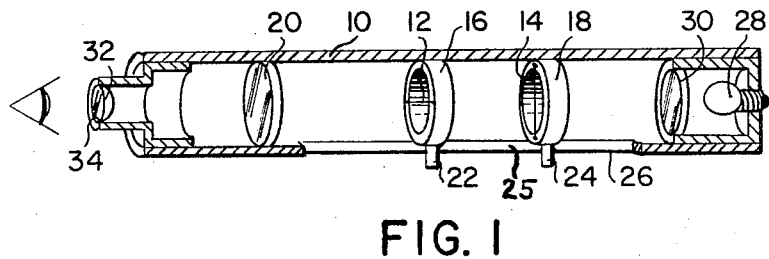
FIG. 1 is a cross-sectional view of an optometer employing one embodiment of the invention using one type of target.

Referring first to FIG. 1, there is shown an optometer utilizing the present invention. The optometer is housed in tube 10 which may be rotated by conventional means not shown about its longitudinal axis for the purpose of alignment with the principal meridians of the subject lens. Line targets 12 and 14, at right angles to each other, mounted on slideably movable holders 16 and 18, are located within tube 10 on the posterior side of converging lens 20. The targets 12 and 14 are axially movable by means of handles 22 and 24 attached to holders 16 and 18 respectively and extending through slot 26 in tube 10. Scales 25 are located along slot 26 on the outside of tube 10 for the purpose of determining the axial position of targets 12 and 14. The targets are illuminated by light source 28 through diffusing plate 30.

Diverging cylindrical lens 32 having axis 34 aligned with line target 14 is located in the anterior field of the converging lens 20 most conveniently coincident with the principal focal plane of lens 20. The effect of cylindrical lens 32 positioned in this way is optically the same as if target 14 were displaced a constant amount forward, this amount directly proportional to the power of cylindrical lens 32. Target 12, on the other hand, is oriented perpendicular to the axis of cylindrical lens 32, and its position is not affected optically by this lens. The images of targets 12 and 14 may thus be made to pass through one another without the actual targets ever doing so.

Figure 2:
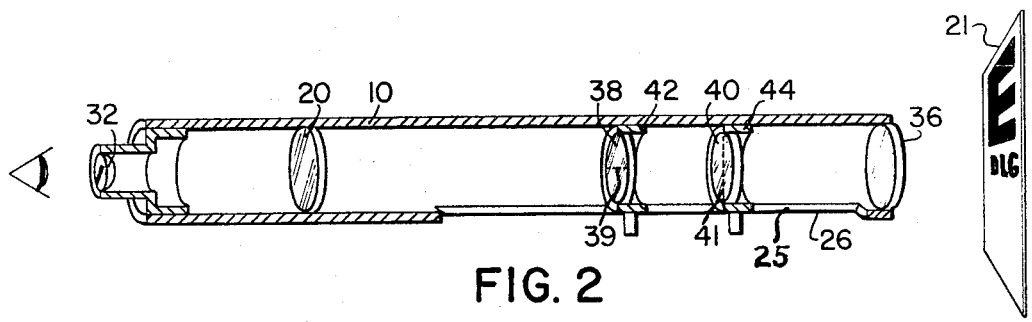
FIG. 2 is a cross-sectional view of the apparatus of FIG. 1 showing a second type of target with an associated optical imaging system.

Referring next to FIG. 2, an alternative embodiment allowing the use of a different type of target is shown. The converging lens 20 and components forward of that lens remain the same. A wall chart 21, such as the standard letter chart used for determining visual acuity, is placed a selected distance from the instrument and illuminated by means not shown. A collimating lens 36, having a focal length equal to the distance from the lens to the chart, is mounted at the posterior end of the instrument.

Cylindrical lenses 38 and 40 are mounted in holders 42 and 44 which are slideably mounted in tube 10. These lenses are of approximately equal focal length and have orthogonal axes. These axes are designated by lines 39 and 41 respectively. Each cylindrical lens forms in its principal focal plane an image of a segment of the wall chart target which image is aligned with the axis of the cylindrical lens which forms it. Each of these two images so formed is treated as a target segment by the converging lens 20, and the position of these target segment images may be varied by moving holders 42 and 44 in similar manner as in the embodiment described above. Cylindrical lens 32 has precisely the same effect as it had above. It will be noted, however, that this arrangement effectively separates any plane target into two orthogonal target segments which may then be independently moved axially through one another. Thus the device is not limited to line targets alone.

Figure 3:
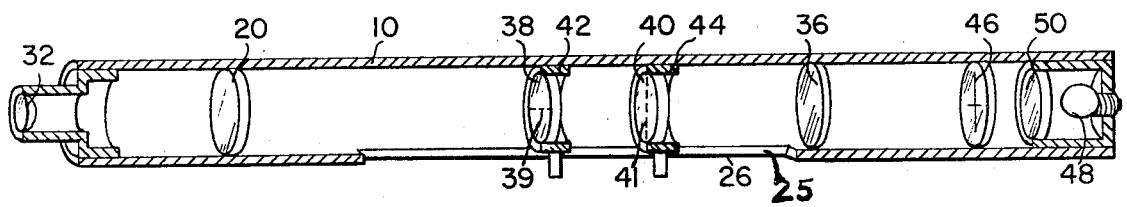
FIG. 3 is a partial cross-sectional view showing another embodiment of the arrangement of FIG. 2.

FIG. 3 shows a view of an alternative embodiment of the system of FIG. 2. All elements are the same except that the target 46 which is collimated by the collimating lens 36 is mounted within the instrument and is illuminated by light source 48 through diffusing plate 50. In this arrangement, the target rotates with the instrument. Here the need for a distant wall chart is eliminated, and also various line targets may be used, which require constant alignment with the axes of the image-forming cylindrical lenses.

What is claimed is:

1. In an instrument for measuring the refractive power of a subject lens in combination
   (a) a converging lens;
   (b) means for positioning the subject lens on the anterior side of said converging lens;
   (c) a target positioned on the posterior side of said converging lens having at least two separately moveable orthogonal segments;
   (d) a first cylindrical lens positioned on the anterior side of said converging lens having an axis aligned with a first of said target segments for optically displacing the image of said first target segment in the direction of the image of a second of said target segments; and
   (e) a scale for measuring the relative position of said converging lens and said target segments, said scale indicating said refractive power of said subject lens.

2. The apparatus of claim 1 wherein said cylindrical lens is positioned in the focal plane of said converging lens.

3. The apparatus of claim 2 including lens means for forming said target segments as aerial images of a target format, said means positioned on the posterior side of said converging lens.

4. The apparatus of claim 3 wherein said lens means comprises a first collimating lens and second and third cylindrical lenses having orthogonally disposed axes and means for moving each of said second and third lenses along the longitudinal axis of said instrument.

5. The apparatus of claim 4 wherein said second and third cylindrical lenses have substantially equal focal lengths.

References Cited

UNITED STATES PATENTS 1,070,631   8/1913   Rogers _____ 351—27

DAVID SCHONBERG, Primary Examiner

P. A. SACHER, Assistant Examiner

U.S. Cl. X.R.

3511—6, 13, 34